United States Patent [19]

Kozawa et al.

[11] 4,434,277

[45] Feb. 28, 1984

[54] POLYOL FOR A POLYURETHANE PREPARED BY REACTING AN EPOXIDE WITH THE REACTION PRODUCT OF A PHENOL, AN AROMATIC AMINE, AN ALDEHYDE AND A DIALKANOLAMINE

[75] Inventors: Shigeyuki Kozawa; Noboru Hasegawa; Hiroshi Kawahara, all of Yokohama, Japan

[73] Assignee: Asahi Glass Company, Ltd., Tokyo, Japan

[21] Appl. No.: 335,835

[22] Filed: Dec. 30, 1981

[51] Int. Cl.$^3$ ............................................. C08G 65/40
[52] U.S. Cl. .................................... 525/507; 252/182; 528/98; 528/99
[58] Field of Search ..................... 525/507; 528/98, 99; 252/182

[56] References Cited

U.S. PATENT DOCUMENTS

| | | | |
|---|---|---|---|
| 3,222,305 | 12/1965 | Lanham | 525/507 |
| 3,297,597 | 1/1967 | Edwards et al. | 521/166 |
| 4,001,329 | 1/1977 | Bell | 564/326 |

FOREIGN PATENT DOCUMENTS 1061210  3/1967  United Kingdom.

*Primary Examiner*—Maurice J. Welsh
*Attorney, Agent, or Firm*—Oblon, Fisher, Spivak, McClelland & Maier

[57] ABSTRACT

A polyol for a polyurethane produced by reacting an epoxide with a reaction product obtained by reacting at least four components of (a) a phenol compound having the formula A—OH (A represents an aromatic ring having at least two reactive sites), (b) an aromatic amine having the formula B—NH$_2$ (B represents an aromatic ring having at least two reactive sites), (c) an aldehyde and (d) an alkanolamine.

13 Claims, No Drawings

POLYOL FOR A POLYURETHANE PREPARED BY REACTING AN EPOXIDE WITH THE REACTION PRODUCT OF A PHENOL, AN AROMATIC AMINE, AN ALDEHYDE AND A DIALKANOLAMINE

BACKGROUND OF THE INVENTION

1. Field of the Invention

The present invention relates to a novel polyol and a process for producing a rigid polyurethane foam derived from the polyol.

2. Description of the Prior Art

A polyurethane is usually produced by reacting an active hydrogen compound such as a polyol with a polyisocyanate. The typical polyol is a polyetherpolyol produced by bonding an intiator to an alkyleneoxide. The initiator is a compound having two or more active hydrogen atoms. The typical active hydrogen atom is hydrogen atom in hydroxyl group or amine group.

The polyurethane foam as one kind of polyurethane is classified into a flexible foam and a rigid foam. The polyol for the flexible foam is mainly a polyol having 2-4 of hydroxyl groups. The polyol for the rigid foam is mainly a polyol having up to 8 of hydroxyl group. The initiator used for producing the polyol for the rigid foam is mainly a saccharide or a mixture of a saccharide and an alcohol having 3 or 4 OH group such as glycerin. Sometimes, an aromatic initiator is used in view of an application.

The rigid polyurethane foam produced by using a polyol obtained by bonding an aromatic initiator to an epoxide may have the improved rigidity and thermal flexibility.

The typical aromatic initiator is novolak type initiator obtained by condensing phenol and formaldehyde. Sometimes, aromatic amine is added. The initiator obtained by condensing an aldehyde, a phenol and aniline is disclosed in U.S. Pat. No. 3,222,305 and the initiator obtained by condensing an aldehyde, a phenol and/or aniline and a nonaromatic primary amine is disclosed in British Pat. No. 1,061,210. Thus, these initiators are not satisfactory thereby requiring certain improvement. For example, the known initiators have problems of dehydration and gelation.

When an epoxide is bonded to the initiator, a diol is produced by the reaction of the epoxide with water when water is present as an impurity. It has been known to cause deterioration of physical properties of the foam in the presence of the diol. On the other hand, the aldehyde-phenol-aniline condensate includes a compound obtained by crosslinking phenyl group by methylene group. Thus, the product also includes a compound having methylol group which remained without the crosslinking. It is quite difficult to completely eliminate the methylol group nevertheless a dehydration is caused under the epoxide adduct reaction. When the crosslinking with the aldehyde is locally concentrated, the polymeric condensation is easily resulted and the gelation is resulted and the adduction of the epoxide is not easy. Moreover, in the production of the condensate disclosed in the latter prior art reference, the reaction is not stoichiometrically performed and the object condensate is not easily produced at high yield. Moreover, there is a problem of uneasy availability of an initiator having a desired number of functional groups.

In order to improve the condensate disclosed in the reference, an initiator is produced by reacting the components except replacing the primary amine to an alkanolamine and a polyol is produced by using the initiator and a polyurethane foam is produced by using the polyol to evaluate the polyol. The main reaction of the aldehyde, aniline and the alkanolamine is considered as Mannich reaction. It is considered that the aniline having alkanolaminomethylene group is produced by reacting the aldehyde and the alkanolamine reaction product with p- or o-site of the aniline. However, the Mannich reaction is not effectively performed but a methylene crosslinking reaction between aniline molecules is mainly performed. It has been found to be difficult to overcome the problem.

On the other hand, the polyol produced by using the aldehyde-phenol-alkanolamine reaction product as an initiator is known and is disclosed in U.S. Pat. No. 3,297,597. However, the condensate of the three components is not satisfactory. That is, the reaction velocity for the production of the reaction product is not high enough and the alkyleneoxide adduction reaction velocity is not high enough. The compression strength and the dimensional stability of the polyurethane foam obtained by using the polyol obtained by the adduction of alkyleneoxide to the reaction product are not high enough.

SUMMARY OF THE INVENTION

It is an object of the present invention to produce a polyol at high efficiency and to obtain a polyurethane foam having excellent characteristics.

The foregoing and other objects of the present invention have been attained by providing a polyol for a polyurethane produced by reacting an epoxide with a reaction product obtained by reacting at least four components of (a) a phenol compound having the formula A—OH (A represents an aromatic ring having at least two reactive sites), (b) an aromatic amine having the formula B—NH$_2$ (B represents an aromatic ring having at least two reactive sites), (c) an aldehyde and (d) an alkanolamine.

DETAILED DESCRIPTION OF THE PREFERRED EMBODIMENTS

The phenol compound (a) has at least two non-substituted reactive sites in the aromatic ring. The reactive sites are usually at p- or o-position and preferably have not a substituent group for at least two reactive sites. The typical compounds include phenol, alkylphenols, halophenols, dialkylaminophenols, alkoxyphenols and dihydroxy benzenes which have at least two reactive sites. It is optimum to use phenol having no substituent.

The aromatic amines (b) has at least two non-substituted reactive sites on the aromatic ring as that of the phenol compound. The reactive sites are usually at p- or o-position and preferably have not a substituent group for two reactive sites. The typical compounds include aniline, diaminobenzene, alkyl-substituted anilines and N-alkylaminoanilines. It is optimum to use aniline.

The aldehydes (c) can be formaldehyde, acetoaldehyde, propionaldehyde and aldehyde condensates such as para-formaldehyde and paraacetaldehyde, and chloral. It is especially preferable to use formaldehyde and paraformaldehyde. The compound can be used in a form of a solution in water or the other solvent.

The alkanolamine (d) can be primary, or secondary alkanolamines especially dialkanolamines. The typical alkanolamines can be diethanolamine, dipropanolamine and di-(2-hydroxypropyl) amine. It is optimum to use diethanolamine.

Two or more kinds of each of the four components can be used. That is, two kinds of the phenol compounds and two kinds of the aromatic amines can be used. Moreover, a small amount of the other component can be incorporated into the four components. For example, the reaction can be performed after an addition of an amine beside the aromatic amines to the four components.

The reactive sites of the aromatic ring of the phenol compound and the aromatic amine are crosslinked with an alkylene group to produce a condensate formed by crosslinking the aromatic rings by alkylene group. The aldehyde or the dialkanolamine and the phenol compound or the reactive sites of the aromatic amine or a condensate thereof and the dialkanolamine are bonded with alkylene group. The latter reaction is Mannich reaction. In the process of the present invention, both the crosslinking reaction and Mannich reaction are performed. The crosslinking reaction is easily performed under the usual condition. The crosslinking reaction is to crosslink the phenol compound with the aromatic amine. It is considered that the crosslinking reaction between the phenol compounds or between the aromatic amines is relatively slow. Thus, in the reaction of the four components, the following reaction of the phenol, the aromatic amine and the aldehyde is resulted to form the condensate.

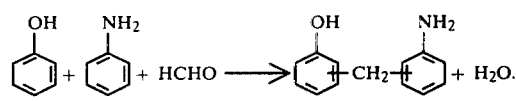

The reaction is further performed to produce the condensate alternatively arranging the phenol compound and the aromatic amine through each alkylene group. The viscosity of the system is raised depending upon the increase of the molecular weight of the condensate. Thus, it is considered to reduce the velocity of the crosslinking reaction depending upon the increase of the molecular weight of the condensate. The reaction velocity gradually reduced to be slower than the reaction velocity of Mannich reaction. Then, the aldehyde is spent for the Mannich reaction instead of the crosslinking reaction to reduce the velocity for increasing the molecular weight of the condensate. In the range of the preferable reaction temperature described below, the number of the aromatic rings in one molecule of the condensate is considered to be average 2 to 10 especially about 2 to 6.

The reaction of the condensate, the aldehyde and the alkanolamine is performed as Mannich reaction.

When the condensate is a condensate of the three functional compounds of the phenol compound or aniline, the aromatic rings, at both ends of the condensate have each two reactive sites and the aromatic rings in the chain have each one reactive site.

In the case of the condensate of the bifunctional compound, only the aromatic rings at both ends have each one reactive site. The Mannich reaction is as follows:

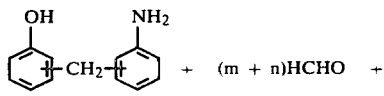

-continued

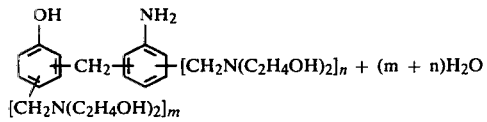

wherein m and n are respectively o or an integer of 1 or 2, and m+n represents 1 to 4.

The average number of the alkanolaminomethylene group formed by Mannich reaction is preferably one or less per the aromatic ring of the condensate. The condensation reaction and the Mannich reaction are competitive reactions. The reaction product is a mixture of various compounds. Thus, the initial condensation reaction is easily performed. When the phenol compounds and the aromatic amines are charged at substantially equal mole, it is considered to be quite small for reacting them by the Mannich reaction.

The amount of the alkanolamine (d) can be relatively smaller than those of the other three components. Even though the condensate of the phenol compound (a)—aromatic amine (b)—aldehyde (c) as the known product is produced as a by-product, the polyol can be produced by reacting the condensate with an epoxide. On the other hand, the amount of the alkanolamine (d) can be relatively large to remain it as the unreacted compound. The polyol can be produced by reacting the unreacted compound with an epoxide.

The viscosity of the polyol obtained by reacting an epoxide with the reaction product of at least the four components is higher depending upon the increase of the ratio of the condensate in the reaction product. It is usually preferable to have lower viscosity for the polyol. Thus, it is considered to be preferably a lower ratio of the condensate in the reaction product as far as the number of the functional groups is enough. Therefore, it is preferable to select the amount of the four components, the reaction condition for easily resulting Mannich reaction. A ratio of the phenol compound (a) to the aromatic amine (b) is not critical and is preferably a/b=¼-4/1 especially ½-2/1. A ratio of the aldehyde (c) to the alkanolamine (d) is preferably c/d=2/0.1-½ especially 1/1.5-1.5/1. A ratio of the sum of the phenol compound (a) and the aromatic amine (b) to the aldehyde (c) is preferably (a+b)/c=½-2/1 especially 1/1.5-1.5/1. It is optimum to be substantially equimole of the phenol compound (a) and the aromatic amine (b) and to be substantially equimole of the aldehyde (c) and the sum of the phenol compound (a) and the aromatic amine (b).

The reaction of the four components is usually performed by admixing the one, two or three component with the remained component. It is usually performed by admixing the three components with the remained one component which is usually the aldehyde. The mixture of three components in the absence of the aldehyde is not substantially reactive. The reaction of the four components is performed without a catalyst. The reaction temperature is preferably at 30°-120° C. especially 50°-100° C. When the reaction temperature is high, the condensation reaction is easily performed. It is preferable to perform the dehydration after the reaction, at the aforementioned temperature.

The reaction can be performed in an inert solvent. The inert solvent is preferably a polyol as a source of a polyurethane such as polyetherpolyol and polyesterpolyol. The Mannich reaction and the condensation is not caused by only the polyol. However, the polyol may be reactive with an epoxide. When the polyol is reactive with an epoxide, the increase of the molecular weight of the product caused by the reaction must be considered. When an epoxide is added in the absence of a catalyst, the possibility of the reaction may be quite small. The reaction with an epoxide may be quite small in the case of the polyol with a solvent having a relatively high molecular weight even though it is in the presence of a catalyst.

As described, the aldehyde-phenol-compound-alkanolamine reaction product is known. Thus, the reaction of these components is not performed at high reaction velocity. When the reaction temperature is high, the condensation of the phenol compound is easily caused. On the other hand, in the present invention, the reaction is easily performed by the catalytic effect of the aromatic amine whereby a mild reaction condition can be employed and the condensation for forming the condensate can be reduced. The catalytic effect of the aromatic amine affects to the adduct reaction of an epoxide and also the reaction for producing a polyurethane to accelerate such reactions. When the condensation is reduced, the by-production of water in the adduct reaction of an epoxide can be reduced.

It is preferable to dehydrate the reaction product of at least four components to remove water used as a solvent for the aldehyde and water formed by the reaction. When a solvent beside the polyol is remained, it is preferable to remove the solvent. The adduction of an epoxide to the reaction product is carried out. The typical epoxides include $C_{2-4}$ alkyleneoxides such as ethyleneoxide, propyleneoxide, butyleneoxide and epichlorohydrin. It is also possible to use alkyleneoxide having 5 or more carbon atoms, aromatic epoxide such as styrene oxide; alicyclic epoxide; glycidyl ether, glycidyl ester and the other epoxides having epoxy group. It is optimum to use propyleneoxide or a mixture of propyleneoxide and ethyleneoxide. In the case of the mixture, both epoxides can be simultaneously used or sequentially used for the adduction.

The adduct reaction of the epoxide to the reaction product can be performed without a catalyst in certain degree. Thus, it is preferable to use a catalyst when the adduction of the epoxide is further required. The typical catalyst is an alkali metal hydroxide. The other catalyst can be used. The reaction temperature is not critical and is usually in a range of 70° to 200° C. especially in a range of about 90° to 130° C. The hydroxy value of the polyol is reduced depending upon the increase of the adduction of the epoxide. The hydroxy value of the polyol is preferably in a range of about 300–700 especially 400–600.

The polyol of the present invention is suitable for a source of polyurethane especially a rigid polyurethane foam. The polyol can be used as a source of the polyurethane and also used by mixing it with the other polyol.

In the production of a rigid polyurethane foam, the polyol of the present invention or a mixed polyol of the polyol of the present invention and the other polyol and a polyisocyanate are used as the main sources. It is usual to add a catalyst, a blowing agent and a foam stabilizer. It is also possible to add a crosslinking agent, a filler, a coloring agent, a stabilizer, a reinforcing fiber, and othe other additive. When the polyol of the present invention and the other polyol are used, a conventional polyol used as a source of a rigid polyurethane foam is preferably used as the other polyol though, it is not critical.

The polyisocyanate is preferably TDI, MDI, crude MDI or the other aromatic polyisocyanate. The catalyst is preferably a mixture of an organometallic compound and an amine type catalyst. The blowing agent is preferably water or a halogenated hydrocarbon such as fluorinated hydrocarbon and methylene chloride. The foam stabilizer is usually a silicone compound. The process for producing a rigid polyurethane foam can be the one shot process, the prepolymer process and the spray process. The polyol of the present invention is especially suitable as the source of a rigid polyurethane foam in the spray process. The present invention also relates to the process for producing the rigid polyurethane foam by using the polyol of the present invention.

In the process of the present invention, there are many nitrogen-containing bonds in the polyol whereby the polyurethane reaction is easily resulted in comparison with the use of the other polyol. Thus, an amount of an amine type catalyst can be smaller than that of the reaction in the use of the other polyol. The rigid polyurethane foam produced by using the polyol has superior dimensional stability in comparison with the rigid polyurethane foam produced by using the other polyol.

The present invention will be further illustrated by certain examples and references which are provided for purposes of illustration only and are not intended to be limiting the present invention.

EXAMPLE 1

Into an autoclave, 94 g. (1 mole) of phenol, 93 g. (1 mole) of aniline and 210 g. (2 mole) of diethanolamine were charged and thoroughly mixed and then, 134 g. (1.7 mole) of 38% formaline was charged. The reaction was performed at 30° C. for 2 hours and then at 100° C. for 2 hours. The reaction mixture was treated at 100° C. under a reduced pressure to remove water to have a content of water of less than 0.1%. After feeding 330 g. of propyleneoxide under a pressure of 3 kg/cm$^2$ or lower for 2 hours, the autoclave was maintained at 100° C. for 1.5 hours to complete the reaction and then, the volatile matter was removed under a reduced pressure. The resulting polyol was analyzed.

OH value (mg KOH/g): 542,
pH: 10.8,
H$_2$O: 0.05%,
viscosity (at 25° C.): 31,800 cp.

EXAMPLE 2

Into an autoclave, 94 g. of phenol, 93 g. of aniline and 210 g. of diethanolamine were charged and thoroughly mixed and then, 71 g. of paraformaldehyde (purity of 85%) was charged. The reaction was performed at 60° C. for 2 hours and then at 100° C. for 1 hour. The reaction mixture was treated at 100° C. to remove water and then, 380 g. of propyleneoxide was fed to react them. The resulting polyol was analyzed.

OH value: 541.0,
pH: 11.2,
H$_2$O: 0.03%,
viscosity: 21,300 cp.

EXAMPLE 3

Into an autoclave, 141 g. of phenol, 47 g. of aniline and 210 g. of diethanolamine were charged and thoroughly mixed and then, 71 g. of paraformaldehyde (purity 85%) was charged. The reaction was performed at 60° C. for 2 hours and was completed at 100° C. The reaction mixture was treated to remove water and then, 350 g. of propyleneoxide was fed to react them. The resulting polyol was analyzed.

OH value: 540.3,
pH: 10.7,
$H_2O$: 0.04%,
viscosity: 18,500 cp.

EXAMPLE 4

Into an autoclave, 122 g. of phenol, 112 g. of aniline, and 320 g. of diisopropanolamine were charged and thoroughly mixed and then, 190 g. of 38% formaline was charged. The reaction was performed at 50° C. for 1 hour and at 115° C. for 2 hours. The reaction mixture was treated at 110° C. under a reduced pressure to remove water.

After feeding 450 g. of propyleneoxide under a pressure of 3 kg/cm² or lower for 2 hours, the autoclave was maintained at 110° C. for 1.5 hours to complete the reaction and then, the volatile matter was removed under a reduced pressure. The resulting polyol was analyzed.

OH value: 530.2,
pH: 11.0,
$H_2O$: 0.04%,
viscosity: 23,400 cp.

REFERENCE 1

Into an autoclave, 188 g. of phenol and 210 g. of diethanolamine were charged and thoroughly mixed and then, 71 g. of formaldehyde (purity 85%) was charged. In accordance with the process of Example 2, the reaction was performed and water was removed and 330 g. of propyleneoxide was fed to react them. The resulting polyol was analyzed.

OH value: 533.7,
pH: 10.7,
$H_2O$: 0.03%,
viscosity: 16,900 cp.

REFERENCE 2

Into an autoclave, 186 g. of aniline, and 210 g. of diethanolamine were charged and thoroughly mixed and then, 71 g. of paraformaldehyde (purity 85%) was charged. In accordance with the process of Example 2, the reaction was performed and water was removed and 345 g. of propyleneoxide was fed to react them. The resulting polyol was analyzed.

OH value: 549.1,
pH: 11.3,
$H_2O$: 0.03%,
viscosity: 56,300 cp.

In comparison with the result of Example 2, the viscosity was higher.

EXAMPLES 5 to 8

REFERENCES 3 and 4

Each rigid polyurethane foam was produced by using the polyols obtained in Examples 1 to 4 and References 1 and 2 and physical properties of each product were measured.

Each rigid polyurethane foam was produced by thoroughly mixing 100 wt.parts of each polyol, 2.0 wt.parts of a silicone foam stabilizer SH-193 (manufactured by Toray Silicone), 30 wt.parts of fluorinated hydrocarbon (Freon R-11), 2 wt.parts of water, 0.7 wt.parts of triethylenediamine and a crude tolylenediisocyanate (1.05 times by the active hydrogen atoms) and blowing the reaction mixture in a paper box having a size of 20 cm×20 cm and height of 25 cm. The results are shown in Table 1.

The compressive strength and dimensional stability of the products obtained by using phenol and aniline are remarkably superior to the others.

TABLE 1

| Polyether polyol | Exp. 5<br>Exp. 1 | Exp. 6<br>Exp. 2 | Exp. 7<br>Exp. 3 | Exp. 8<br>Exp. 4 | Ref. 3<br>Ref. 1 | Ref. 4<br>Ref. 2 |
|---|---|---|---|---|---|---|
| Reactivity | | | | | | |
| Cream time (second) | 13 | 12 | 14 | 15 | 14 | 12 |
| Tack free time (second) | 41 | 37 | 39 | 42 | 43 | 40 |
| Physical properties of foam | | | | | | |
| Bulk density (g/m³) | 26.9 | 27.2 | 27.3 | 27.0 | 26.3 | 26.7 |
| Compressive strength (kg/cm²) | | | | | | |
| vertical | 3.00 | 3.27 | 2.93 | 3.19 | 2.56 | 3.17 |
| traverse | 0.60 | 0.57 | 0.55 | 0.59 | 0.46 | 0.57 |
| Dimensional stability | | | | | | |
| 70° C. humidity 95% vertical | 1.4 | 1.3 | 1.8 | 1.5 | 2.3 | 1.6 |
| 24 hours traverse | 4.6 | 5.1 | 5.9 | 4.4 | 6.4 | 4.8 |
| 110° C. vertical | −1.3 | −1.2 | −1.6 | −1.1 | −1.8 | −1.5 |
| 24 hours traverse | 5.9 | 6.0 | 7.0 | 5.8 | 7.5 | 6.3 |
| −20° C. vertical | 0.5 | 0.3 | 0.9 | 0.6 | 1.3 | 0.7 |
| 72 hours traverse | 1.1 | 1.2 | 1.8 | 1.0 | 2.4 | 1.5 |

EXAMPLE 9

Into an autoclave, 63 g. of phenol, 140 g. of aniline and 210 g. of diethanolamine were charged and thoroughly mixed and 71 g. of paraformaldehyde (purity of 85%) was charged. The reaction was performed at 60° C. for 2 hours and at 100° C. for 1 hour. The reaction mixture was treated at 100° C. under a reduced pressure to remove water and then, 380 g. of propyleneoxide was fed to react them. The resulting polyol was analyzed.

OH value: 549.4,
pH: 11.6,
$H_2O$: 0.03%,
viscosity: 16,300 cp.

EXAMPLE 10

Into an autoclave, 94 g. of phenol, 93 g. of aniline and 210 g. of diethanolamine were charged and thoroughly mixed and 71 g. of paraformaldehyde (purity of 85%) was charged. The reaction was performed at 60° C. for 2 hours and at 100° C. for 1 hour. The reaction mixture was treated at 100° C. under a reduced pressure to remove water and 410 g. of propyleneoxide was fed to react them. The resulting polyol was analyzed.
OH value: 532.1,
pH: 10.3,
$H_2O$: 0.03%,
viscosity: 19,400 cp.

EXAMPLE 11

Into an autoclave, 94 g. of phenol, 93 g. of aniline and 210 g. of diethanolamine were charged and thoroughly mixed and then, 71 g. of 85% paraformaldehyde was fed. The reaction was performed at 30° C. for 2 hours and at 100° C. for 2 hours. The reaction mixture was treated at 100° C. under a reduced pressure to remove water to be a content of water of 0.1%. After feeding 165 g. of ethyleneoxide under a pressure of 1.5 kg/cm² or lower for about 1 hour and 165 g. of propyleneoxide under a pressure of 3 kg/cm² or lower, the reaction was continued for 1.5 hours. The resulting polyol was analyzed.
OH value: 540,
pH: 11.3,
$H_2O$: 0.04%,
viscosity: 9,850 cp.

EXAMPLE 12

Into an autoclave, 63 g. of phenol, 140 g. of aniline and 266 g. of diisopropanolamine were charged and thoroughly mixed and then, 71 g. of paraformaldehyde (purity of 85%) was charged. The reaction was performed at 60° C. for 2 hours and then at 100° C. for 1 hour. In the reaction mixture, 2.8 g. of 85% KOH pellets were charged and dissolved. The reaction mixture was treated at 100° C. under a reduced pressure to remove water and then, 400 g. of propyleneoxide was fed to react them and the reaction product was neutralized with acetic acid at the equivalent to KOH. The resulting polyol was analyzed.
OH value: 532,
pH: 9.9,
$H_2O$: 0.04%
viscosity: 22,350 cp.

EXAMPLE 13

Each polyol obtained in Examples 1 and 10 and Reference 1 and 2, and Polyol A (OH value of 560) obtained by an adduction of propyleneoxide to a conventional sorbitol/monoethanolamine/ethylenediamine three component initiator were used in a spray blowing test of a rigid polyurethane foam by a spray blowing machine under the following condition.
Spray machine: spray pressure of 40 kg/cm²
Panel: plywood
Composition:
Polyol: 100
Silicone foam stabilizer: 1.0
Dibutyl-tin maleate: 1.0
Blowing agent (Freon R-11): 50
Triethylenediamine: 0.5
Polyphenylenepolyisocyanate: index [105] (crude MDI)
Temperature: 20° C.

The components were mixed in the spray machine and the mixture was sprayed on the plywood. The results are shown in Table 2. When the polyol of the present invention was used, the product had excellent smoothness and surface gloss. The creep phenomenon and adhesive strength as the important factors for the spray blowing were excellent. Moreover, the voids and flame retardancy were also excellent.

TABLE 2

| Polyol | Exp. 1 | Exp. 10 | Properties of foam Ref. 1 | Ref. 2 | Polyol-A |
|---|---|---|---|---|---|
| Smoothness | excellent | excellent | good | good | bad |
| Surface gloss | excellent | excellent | good | good | bad |
| Thickness of foam (mm) | 20.1 | 19.9 | 20.5 | 21.3 | 20.0 |
| Creep of foam (mm)*1 | 13.0 | 13.1 | 18.4 | 17.8 | 24.5 |
| Adhesive strength (kg/cm²) | 2.4 | 2.6 | 1.9 | 2.0 | 1.0 |
| Voids*2 | none | none | slight | void | void |
| Distance for firing*3 | 62 | 60 | 59 | 95 | 150 (burnt) |

Note:
*1a distance for traverse flow from the edge of the panel
*2voids between the panel and the foam or in the foam
*3ASTM D-1692 Flame retardancy test

We claim:

1. A polyol for the synthesis of a polyurethane prepared by reacting an epoxide with the reaction product obtained by reacting (a) a phenol compound of the formula A—OH, wherein A represents an aromatic ring having at least two reactive sites; (b) an aromatic amine of the formula B—$NH_2$, wherein B represents an aromatic ring having at least two reactive sites; (c) an aldehyde and (d) a dialkanolamine.

2. The polyol of claim 1, wherein said phenol compound is phenol, an alkylphenol, a halophenol, a dialkylaminophenol, an alkoxyphenol and a dihydroxybenzene.

3. The polyol of claim 1, wherein said phenol compound is phenol.

4. The polyol of claim 1, wherein said aromatic amine is aniline, diaminobenzene, an alkyl-substituted aniline and N-alkyl-aminoaniline.

5. The polyol of claim 4, wherein said aromatic amine is aniline.

6. The polyol of claim 1, wherein said aldehyde is formaldehyde, acetoaldehyde, propionaldehyde, paraformaldehyde or paraacetaldehyde.

7. The polyol of claim 1, wherein said dialkanolamine is diethanolamine, dipropanolamine, or di-(2-hydroxypropyl) amine.

8. The polyol of claim 7, wherein said dialkanolamine is diethanolamine.

9. The polyol of claim 1, wherein the molar ratio of said phenol compound (a) to said aromatic amine (b) is a/b = ¼-4/1; the molar ratio of said aldehyde (c) to said alkanolamine (d) is c/d = 2/0.1-½; and the molar ratio of the sum of said phenol compound (a) and said aromatic amine (b) to said aldehyde (c) is (a+b)/c = ½-2/1.

10. The polyol of claim 1, wherein said epoxide is an alkyleneoxide, an aromatic epoxide, an alicyclic epoxide, a glycidyl ether or a glycidyl ester.

11. The polyol of claim 10, wherein said alkyleneoxide contains 2-4 carbon atoms.

12. The polyol of claim 11, wherein said alkyleneoxide is ethyleneoxide, propyleneoxide, butyleneoxide or epichlorohydrin.

13. The polyol of claim 1, wherein the hydroxy value of said polyol is within the range of 300 to 700.

* * * * *